Figure 1:
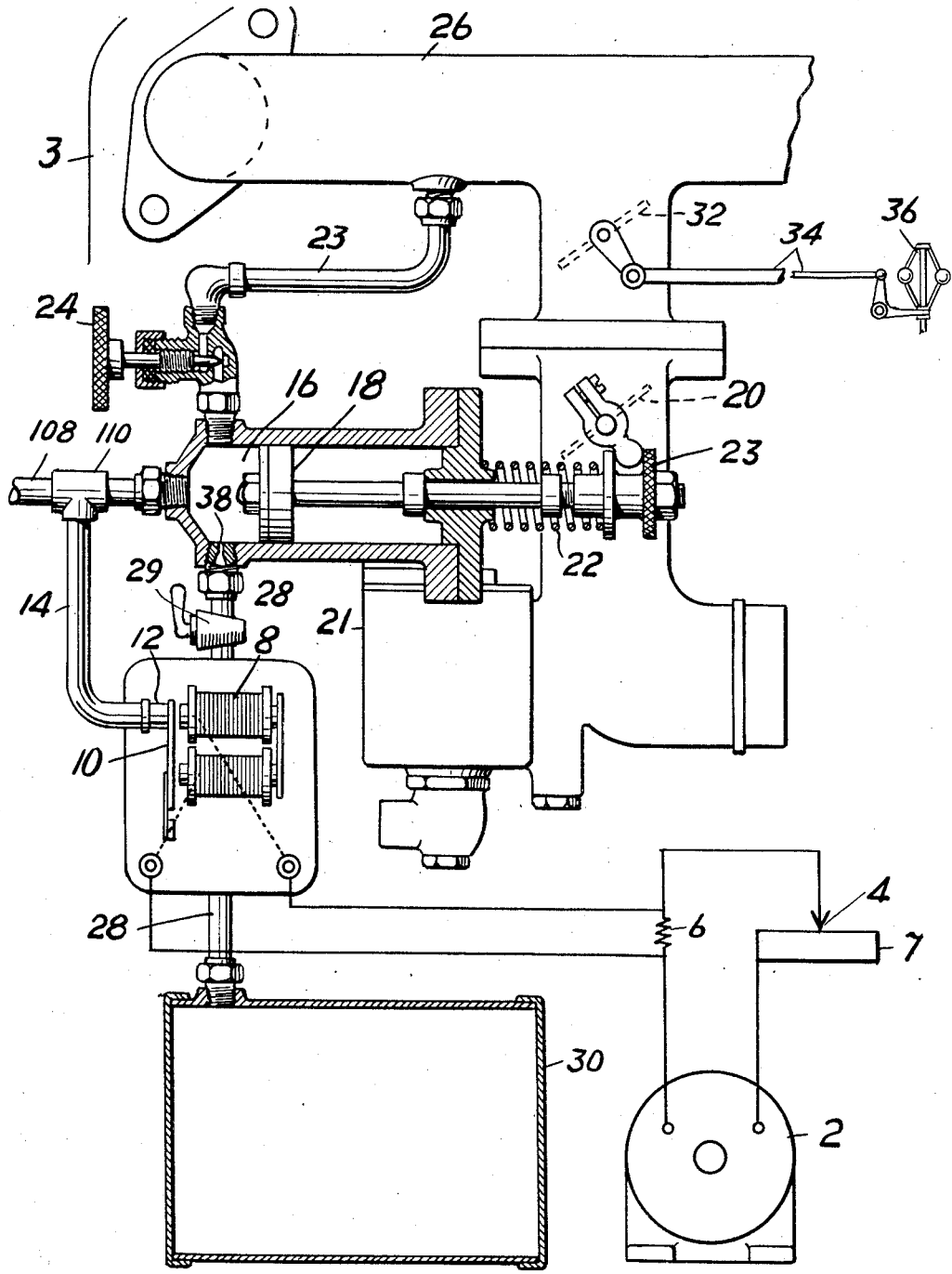

Dec. 10, 1935. A. N. GUSTAFSON 2,023,418
CONTROL FOR INTERNAL COMBUSTION ENGINES
Filed July 1, 1930 3 Sheets-Sheet 3

WITNESS:

INVENTOR
Alfred N. Gustafson
BY
ATTORNEYS.

Patented Dec. 10, 1935

2,023,418

UNITED STATES PATENT OFFICE 2,023,418

CONTROL FOR INTERNAL COMBUSTION ENGINES

Alfred N. Gustafson, West Chester, Pa., assignor to Schramm, Incorporated, West Chester, Pa., a corporation of Pennsylvania Application July 1, 1930, Serial No. 465,119

5 Claims. (Cl. 290—40)

This invention relates to controlling means for an internal combustion engine and particularly a controlling means for an engine arranged to drive a welding apparatus, consisting of a generator and suitable electrode connections, and/or a compressor, the invention relating broadly to means for effecting idling of the engine upon removal of the load and for effecting the delivery of sufficient power when under load.

Certain features of the invention disclosed herein are claimed in my divisional application, Serial No. 582,295, filed December 21, 1931.

Arc welding apparatus consisting of an internal combustion engine driving a generator which furnishes the current for the arc is in common use. Heretofore there have been devised various controls which automatically close the throttle of the engine when the load is removed from the generator and which automatically open the throttle upon the striking of an arc. Assuming, in the case of the ordinary apparatus, that the engine is idling with a closed throttle, if the workman strikes an arc between the electrode and the object to be welded, there is an appreciable time taken up for the engine to come up to full speed and generate sufficient current for properly carrying out the welding operation. While this delay is a matter of seconds, it is annoying to the workman who is doing the welding and in an entire welding operation considerable time is taken up by these intervals during which the engine is gaining speed.

It is one object of the present invention to provide a throttling means for an engine which, as in the case heretofore discussed, will serve to slow down the engine upon the removal of a load and speed up the engine by permitting the introduction of a larger amount of mixture upon the application of a load. The present controlling means, however, differs broadly from that heretofore used in that upon the removal of the load the engine is not immediately throttled down to an idling speed but such throttling occurs only after a substantial interval of time. The object of providing this interval in connection with the welding apparatus is to permit the workman to replace an electrode and continue the welding operation without being obliged to wait until the engine is operating at sufficient speed to cause the generator to supply the necessary current. In other words, with the present invention it is assured that the engine will not operate for any extended periods of time at high speeds without loads, but on the other hand the engine will not slow down to idling speed immediately upon the removal of the load.

A further object relates to the provision of an improved controlling means which may operate with or without the delayed action referred to above. In a simple form it may replace the controlling mechanisms heretofore used in connection with welding apparatus.

It has been found highly advantageous, particularly for structural work, to combine in one unit both a compressor and generator driven by a single internal combustion engine so that, for example, compressed air may be available for riveting work and electricity for welding work in the same operation. The invention is, in its specific aspect, applicable to an arrangement of this type and has for another object the provision of a control for the engine subject to operation under the influence of either the compressor or generator or both.

Further objects of the invention relate to features of control of the compressor and engine by the compressed fluid whereby the compressing action of the compressor is interrupted when the pressure in a reservoir reaches a predetermined maximum and is renewed when the pressure falls. One specific feature of this control consists of means for permitting the idling engine to gain speed prior to the loading of the compressor.

It will be understood as the description proceeds that the various features of the invention are applicable not only to the combination compressor-generator unit disclosed but also to simple compressor units and simple generator units driven separately by suitable engines.

Figure 2:
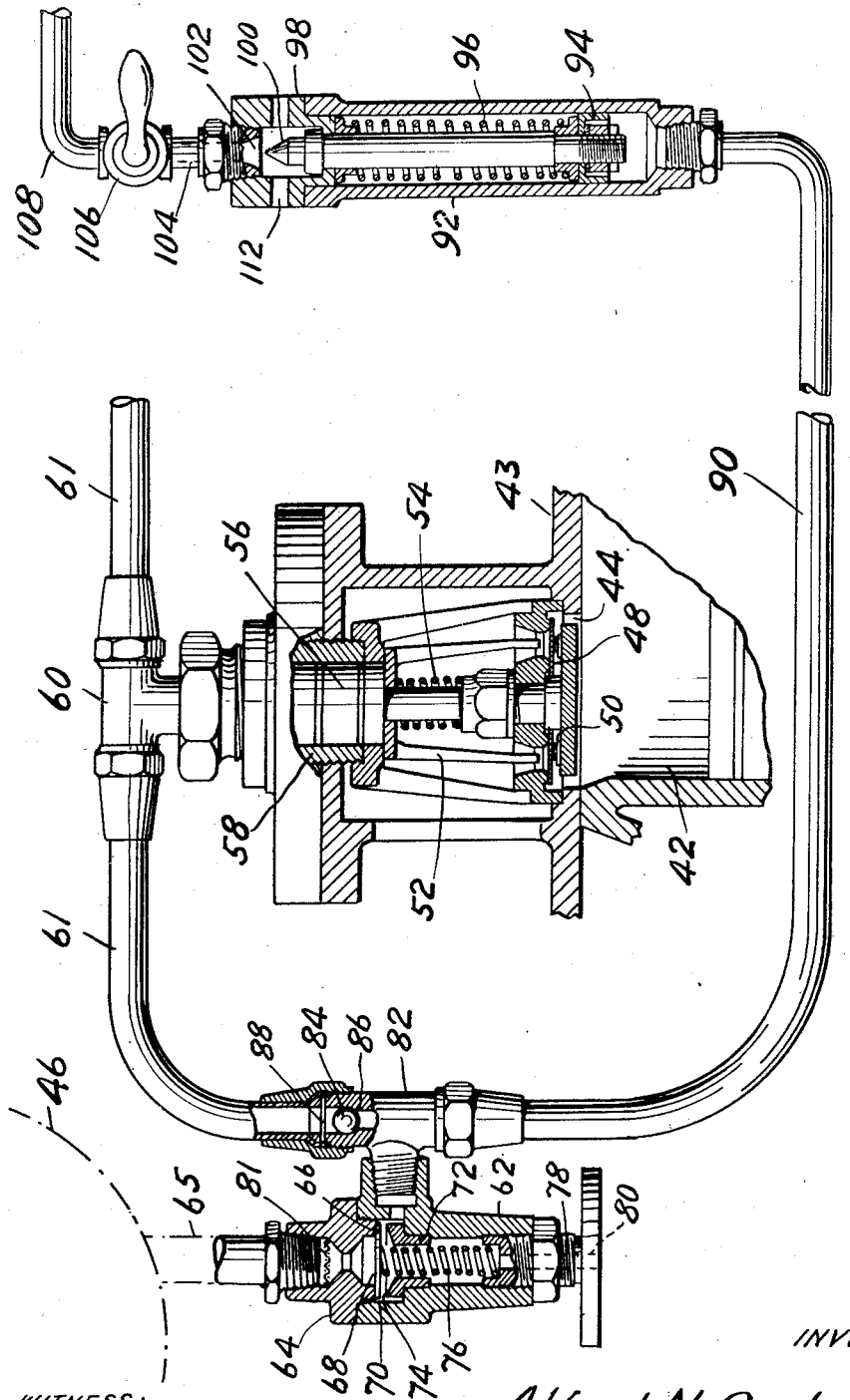
Figure 3:
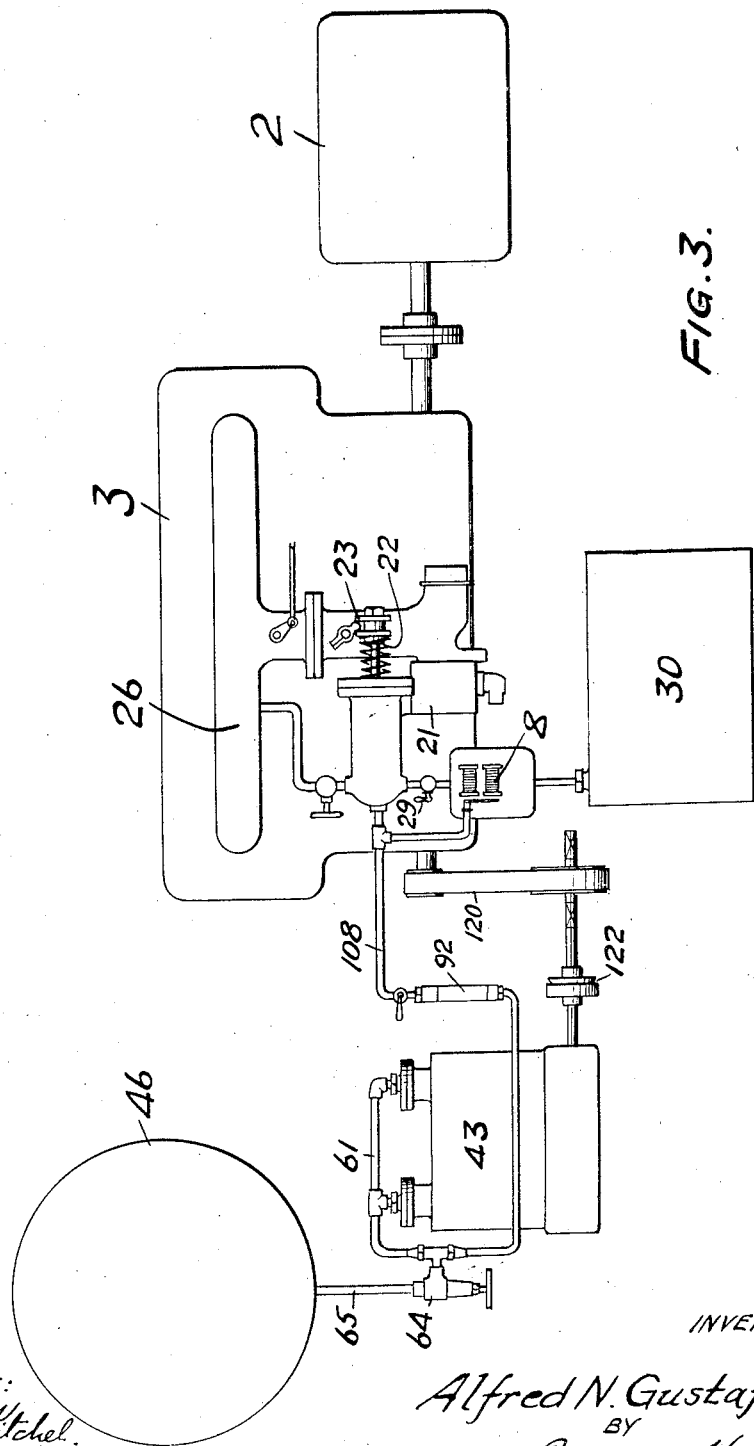

Further objects of the invention relating particularly to details of construction will be apparent from the following description read in conjunction with the accompanying drawings, in which:

Fig. 1 is a diagrammatic illustration, partially in section, of one part of the controlling means, showing particularly the parts immediately connected with the internal combustion engine and generator; and Fig. 2 is a similar diagrammatic illustration of the remainder of the controlling means, showing particularly the connections to the supply tank and compressor intake valve, and Fig. 3 is a general diagrammatic view of a complete unit.

There will first be described those elements of the controlling means illustrated in Figure 1 and particularly related to the welding apparatus, and thereafter there will be described the elements of Figure 2, followed by a description of the operation of the complete mechanism.

The generator, which is diagrammatically illustrated at 2, is driven by the internal combustion engine indicated at 3 which also drives the air compressor. In one type of unit which is found to be quite satisfactory, the generator is directly connected to the shaft of the engine which is operated at a suitable high speed, the compressor being connected by a belt 120 to the engine shaft so as to be driven at a lower speed.

Preferably a clutch 122 is interposed between the engine and compressor so that the latter will not operate when the generator only is being used. In an arrangement of this sort the engine is operating at a higher speed than engines which are normally used to directly drive compressors.

The welding electrode 4 is connected to one pole of the generator through a steadying resistance 6 in the usual manner, the other pole of the generator being connected to the article 7 to be welded.

While current is flowing during the welding operation there will be a potential drop across the resistance 6. Shunted across this resistance is an electromagnet 8, the armature 10 of which normally rests against the open end 12 of a pipe 14 communicating with a cylinder 16. The end 12 of the pipe is formed of rubber tubing or the like against which the armature 10 bears in airtight relationship, so that the armature 10 constitutes, in effect, an electrically controlled valve.

Within the cylinder 16 there slides a piston 18 connected to a butterfly valve 20 in the intake from the carbureter 21, the piston being normally urged outwardly by a spring 22 to locate the butterfly valve in open position. The connection between valve 20 and piston 18 is effected through the medium of an arm on the valve spindle received in the groove of a nut 23 threaded on the piston rod and held in position by a lock nut. Adjustment of nut 23 serves as a ready means for controlling the idling speed of the engine, adjustment being made when the piston is at its innermost position.

Affording communication between the cylinder 16 and the intake manifold 26 there is located a conduit 23 in which is interposed an adjustable needle valve 24 which may restrict to any desired degree the pasage of air through the conduit. A second connection 28, in which may be interposed a shutoff valve 29, joins the cylinder 16 with a tank 30.

Located in the intake from the carbureter is a second butterfly valve 32 which is connected by means indicated at 34 with the usual speed governor, conventionally illustrated at 36. This butterfly valve is so connected as to close when the speed rises above a predetermined limit and open when the speed falls so that, disregarding the valve 20, the engine speed would be maintained substantially constant, this constant speed being the normal speed of operation at full load.

The communication between pipe 28 and cylinder 16 is restricted as indicated at 38 for a purpose hereinafter pointed out.

Passing now to Figure 2, it will be seen that only so much of the compressor and driving engine is disclosed as is necessary to clearly show the operation of the controlling device. It will be understood that the compressor may be provided with any number of cylinders, one of which, containing a reciprocating piston, is illustrated at 42. The cylinder head 43 is provided with suitable valve controlled inlet and exit openings, the former being shown at 44. The compressed air, or other gas, is forced from the cylinder into the usual supply tank 46 from which it may be drawn for use. The inlet valve comprises a disk 48 pressed upwardly by springs 50 against a suitable seat to normally prevent exit of air during the upstroke of the piston, the springs 50 yielding during the downstroke under atmospheric pressure above disk 48 to permit entrance of air into the cylinder. A plurality of fingers 52 are normally held spaced upwardly away from disk 48 by a spring 54 acting to move upwardly their supporting piston 56 slidable in a cylinder 58 which communicates at its upper end with a T-fitting 60 in an air line 61. It will be seen that admission of air at sufficient pressure into line 61 will depress piston 56 and fingers 52 to open the intake valve during the maintenance of pressure in the line. Similar means for opening the intake valves of the other cylinders communicate in like manner with line 61. Other types of inlet valves may be controlled by suitable air pressure actuated means as will be readily understood.

The valve which controls the flow of air into lines 61 and 90, which latter is later described, comprises a casing 62 surmounted by a bonnet 64 to which is secured a tube 65 furnishing communication between the tank 46 and the interior of the valve. A disk 68 having plane faces is located within an upper cylindrical portion of the bore of casing 62 and is adapted for vertical movement between an annular plane seat 66 formed on bonnet 64 and an annular plane seat 74 formed on the upper end of a bushing 72. The disk and seats are finely ground to insure air tight contact between the disk faces and the respective seats. The disk fits the bore of the casing loosely, whereby a slight clearance 70 is provided between its edge and the wall of the bore for leakage of air. A spring 76, extending through bushing 72, normally forces the disk against seat 66, its tension being adjustable by inward or outward movement of its abutment provided on a screw 78 threaded into the interior of the casing. A hole 80 extending axially through the screw furnishes communication between the interior of the casing below the disk and the atmosphere. A screen 81 prevents dirt particles from the tank 46 from entering the valve and causing faulty seating of the disk.

A T-fitting 82 communicates with the interior of the casing as shown outside of and below seat 66. The fitting is connected respectively to air lines 61 and 90, the end communicating with the former being provided with a ball check valve 84 resting on a seat 86 and retained in the fitting by a cross pin 88.

The line 90 communicates with the lower end of a cylinder 92 within which slides a piston 94 urged downwardly by a spring 92 reacting against the cylinder head 98 so as to normally retract the tapered upper end 100 of the piston rod from its seat 102 communicating with a connection 104 to a plug or other suitable shut off valve 106, the other side of which is connected through a pipe 108 with a T-fitting 110 in the line 14 between the seat 12 and cylinder 16, as illustrated in Figure 1. Openings 112 in the head 98 normally furnish communication between connection 104 and the atmosphere except when the end 100 of the piston rod engages its seat 102 shutting off such communication.

There will now be considered the operation of the apparatus when the generator alone is being used. At this time valve 106 will be closed thereby cutting off all the apparatus illustrated in Figure 2 from that illustrated in Figure 1.

The compressor may be disconnected from the engine by throwing out the clutch in the connections therewith; or, if no clutch is interposed, as may sometimes be desirable, the compressor may be idly driven. Such idle operation may be effected by opening tank 46 to the atmosphere, by depressing fingers 52 by some type of manual adjusting means (not illustrated) so as to hold the intake valves open, or by making use of the control arrangement by permitting operation of the compressor until normal load pressure is attained in tank 46 whereupon the intake valves will be opened in the manner hereafter described. Since valve 106 is closed it is necessary to consider only the operation of the elements in Figure 1. At this time valve 29 is open.

Assuming that the arc has not been struck between the electrode 4 and the article 7 to be welded, there will be no potential drop across the resistance 6 and consequently the electromagnet 8 will be deenergized. The armature 10 will then close the end 12 of the tube 14. At this time the butterfly valve 32 is in wide open position so that, unless another control was provided, the engine speed would tend to build up to normal full load speed, which is rather high and for the maintenance of which speed a considerable amount of fuel would be used. This speed would accordingly be rather objectionable in the absence of a load on the engine. At this time, however, a vacuum is produced in the cylinder 16 drawing piston 18 to the left and closing valve 20 to its idling position so that the speed is reduced to an idling speed. The action occurring in drawing the piston 18 to the left is somewhat cumulative since, as the valve 20 closes, the vacuum in the intake manifold increases. Accordingly the valve closes with an accelerated movement. The position of the parts just described would be the normal one when welding was not being done. The tank 30, as well as the cylinder 16, would be subject to the vacuum existing in the intake manifold.

If, now, the arc is struck at the electrode 4, there will at first be a relatively slight flow of current because of the considerably reduced speed of the generator, but this will be enough to produce a voltage drop across the coil 6 sufficient to energize the electromagnet and thereby open the tube 14 to the atmosphere. As soon as this occurs, air rushes into the cylinder and valve 20 is snapped open due to the action of the spring 22. Since prior to this time the valve 32 will be fully open due to the low speed of the engine, the full amount of fuel will be introduced so that the engine is capable of picking up to full load speed in a minimum of time. In order to prevent lag due to the necessity of air filling the tank 30, the restricted opening is provided at 38. By reason of this, the cylinder pressure reaches atmospheric some time prior to the time when the pressure in the tank 30 reaches atmospheric. In this initial striking of the arc, the operator must, of course, wait for the short interval which is required for the engine to pick up speed.

If the arc is now broken, the armature 10 will close the end of the tube 14. At this time, however, both tank 30 and the cylinder 16 will contain air which will be withdrawn gradually through the adjustable needle valve into the intake manifold. By providing a proper size of tank 30 and by proper adjustment of the needle valve 24, there may be produced a delay of as much as one to two minutes before the valve 20 is closed to its idling position. It is this delay which forms one of the important features of the invention, since the workman frequently desires to change his electrode, an operation which may be performed in a few seconds, whereupon he may resume the welding operation without waiting even for the few seconds which the engine requires to pick up speed. On the other hand, the controlling mechanism insures that the engine will not operate at full speed under no load conditions for any appreciable length of time. Besides cooperating with the tank 30 in controlling the time interval, the needle valve 24 has a second important function of permitting only a limited flow of air to the intake manifold. If the conduit 23 were wide open and affording unrestricted flow of air, the mixture in the intake manifold would be very greatly diluted, since the cylinder is freely opened to the atmosphere during load conditions by reason of the retracted position of the armature 10.

It will be obvious that while the controlling mechanism is of particular advantage in connection with a welding apparatus, the controlling mechanism will be useful for other purposes, for example, if the generator is furnishing current for lighting, radio purposes, etc. It will also be obvious that the improved mechanism will offer considerable advantages in the way of simplicity even though the tank 30 is eliminated where all that is desired is a slowing down of the engine when the load is removed irrespective of whether this slowing down occurs rapidly or slowly.

While valve 106 is preferably provided to close passage 108 during operation of the welder alone, if the compressor is unloaded with a full tank 46, the pressure will seat valve 100 thus closing the passage even though no valve such as 106 is provided.

Let it be now assumed that the welder is not being used and the compressor alone is operating. So long as the circuit of the generator is open, very little power is required to turn its armature. Accordingly such idle rotation is quite satisfactory and there is no need to disconnect the generator. During the operation now considered, valve 106 is opened to furnish communication between seat 102 and cylinder 16. Armature 10 closes seat 12 as long as no load is on the generator.

During the operation of the machine to fill tank 46, fingers 52 are retracted from disk 48, thus permitting its normal operation, and air is forced into tank 46, the engine operating with open throttle. Disk 68 will then be forced against seat 66 by spring 76. At this time the pressure in the tank is exerted on a circular area of the upper face of the disk having as diameter the inner diameter of seat 66. The seating of ball 84 is imperfect (for a reason later described) and accordingly lines 61 and 90 are in communication with the atmosphere through the casing 62 and opening 80.

When the pressure above disk 68 rises sufficiently to overcome the tension of spring 76, the disk will move away from seat 66. Immediately the area on which pressure is acting increases to the full disk area and consequently the disk is moved positively and instantly against seat 74 in spite of the slight increase in tension of the spring, which is more than compensated for by the increased area of pressure. The clearance between the disk 68 and the walls is so slight as not to permit such great leakage about the edges as to create a counterbalancing pressure on the bottom of the disk, and the pressure thereunder is therefore substantially atmospheric until the disk seats on 74 and thereafter.

After seating of the disk the leakage, though slight, will raise the pressure about bushing 72 and in lines 61 and 90 to the pressure in tank 46. Consequently piston 56 will be forced downwardly causing fingers 52 to hold each valve 48 in open position so that the piston in each cylinder of the compressor will produce an idle flow of air into and out of the cylinder. At the same time piston 94 will be forced upwardly so that valve 100 will seat at 102 closing off communication between cylinder 16 and the atmosphere. Air will then be drawn from cylinder 16 causing movement of piston 18 to close throttle 20 to its idling position. To secure rapid slowing down of the engine, the valve 29 in the pipe 28 may be closed so that tank 30 need not be exhausted before movement of the piston occurs. The delayed slowing down, which is important for welding, is not necessary in the use of the compressor since tank 46 furnishes air during the interval during which the engine gains speed.

As compressed air is drawn from tank 46, the pressure therein drops so that the tension of spring 76 is sufficient to overcome the pressure above the disk. As soon as the disk rises from seat 74, the air in fitting 82 and line 90 rushes over the seat towards opening 80 creating a momentary back pressure against the underside of the disk serving to reinforce the spring 76 to snap the disk upwardly against seat 66. As soon as such seating is effected, the area of pressure above the disk is decreased so that, although the pressure below it is atmospheric, the spring alone will produce tight seating until the pressure again rises as above described.

Upward movement of the disk opens line 90 to the atmosphere, whereupon piston 94 drops, air rushes into cylinder 16, and throttle 20 is snapped open. The pressure in line 61 does not immediately fall to atmospheric pressure but does so only after an interval determined by the velocity of leakage of air past valve 84 which is provided with an imperfect seat permitting slow leakage. Thus valve 48 is permitted to close only after the engine gains speed whereby stalling due to a sudden imposition of a load on the idling engine will be prevented.

It will be noted that the disk is positively snapped against both seats and remains on one or the other until the pressure in tank 46 varies to a considerable degree between maximum and minimum pressures. Floating of the disk on the spring with resultant continual starting and stopping is thereby prevented.

Under certain conditions it may be desired to use both the compressor and welder. At this time both valves 106 and 29 will be opened and piston 18 will respond to the requirements of both the generator and compressor; that is, whenever the generator requires power the cylinder is opened to the atmosphere through 12, while whenever the compressor requires power the cylinder is opened to the atmosphere through 102.

While the invention has been described with specific reference to an internal combustion engine driven compressor-generator unit, it will be obvious that its various features are more broadly applicable within the scope of the invention as defined by the following claims.

What I claim and desire to protect by Letters Patent is:

1. In combination with an internal combustion engine, means for controlling the engine including a throttle valve for controlling the flow of fuel to the intake of the engine, a cylinder, a piston in the cylinder connected to the valve, means urging the piston outwardly of the cylinder to open the valve, said cylinder being connected to the intake whereby a vacuum may be produced in the cylinder to effect closure of the valve by inward movement of the piston, means automatically operated upon application of a load to the engine to break the vacuum in the cylinder, and means for delaying the production of a vacuum in the cylinder upon removal of a load, said last named means including a tank communicating with the cylinder to be exhausted therewith.

2. In combination with an internal combustion engine, means for controlling the engine including a throttle valve for controlling the flow of fuel to the intake of the engine, a cylinder, a piston in the cylinder connected to the valve, means urging the piston outwardly of the cylinder to open the valve, said cylinder being connected to the intake whereby a vacuum may be produced in the cylinder to effect closure of the valve by inward movement of the piston, means automatically operated upon application of a load to the engine to break the vacuum in the cylinder, and means for delaying the production of a vacuum in the cylinder upon removal of a load, said means including a restricted passage between the cylinder and intake and a tank communicating with the cylinder to be exhausted therewith.

3. In combination with an internal combustion engine, means for controlling the engine including a throttle valve for controlling the flow of fuel to the intake of the engine, a cylinder, a piston in the cylinder connected to the valve, means urging the piston outwardly of the cylinder to open the valve, a connection between the cylinder and intake, a connection between the cylinder and atmosphere, a valve controlling the last mentioned connection, said last named valve being closed when the engine is unloaded, means for opening the last named valve upon application of a load to the engine, and a tank connected to the cylinder.

4. In combination with an internal combustion engine, means for controlling the engine including a throttle valve for controlling the flow of fuel to the intake of the engine, a cylinder, a piston in the cylinder connected to the valve, means urging the piston outwardly of the cylinder to open the valve, a connection between the cylinder and intake, a connection between the cylinder and atmosphere, a valve controlling the last mentioned connection, said last named valve being closed when the engine is unloaded, means for opening the last named valve upon application of a load to the engine, the connection between the cylinder and intake being restricted, and a tank connected to the cylinder.

5. In combination with an internal combustion engine, means for controlling the engine including a throttle valve for controlling the flow of fuel to the intake of the engine, a cylinder, a piston in the cylinder connected to the valve, means urging the piston outwardly of the cylinder to open the valve, a connection between the cylinder and intake, a connection between the cylinder and atmosphere, a valve controlling the last mentioned connection, said last named valve being closed when the engine is unloaded, electrically operated means for opening the last named valve upon application of a load to the engine, the connection between the cylinder and intake being restricted, and a tank connected to the cylinder.

ALFRED N. GUSTAFSON.